(12) United States Patent
Schwing et al.

(10) Patent No.: US 11,455,308 B2
(45) Date of Patent: Sep. 27, 2022

(54) PARTITION AWARE PARTIAL QUERY PROCESSING

(71) Applicant: SAP SE, Walldorf (DE)

(72) Inventors: Julian Schwing, Heidelberg (DE); Johannes Merx, Heidelberg (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 558 days.

(21) Appl. No.: 15/354,852

(22) Filed: Nov. 17, 2016

(65) Prior Publication Data
US 2018/0137011 A1  May 17, 2018

(51) Int. Cl.
*G06F 16/2455* (2019.01)

(52) U.S. Cl.
CPC ............... *G06F 16/24554* (2019.01)

(58) Field of Classification Search
CPC ........... G06F 11/1451; G06F 17/30486; G06F 2201/80; G06F 17/30445; G06F 17/30498; G06F 17/30501
See application file for complete search history.

(56) References Cited

U.S. PATENT DOCUMENTS

| | | | | |
|---|---|---|---|---|
| 5,794,229 A | * | 8/1998 | French | G06Q 40/00 |
| 5,857,180 A | * | 1/1999 | Hallmark | G06F 9/466 |
| 6,311,265 B1 | * | 10/2001 | Beckerle | G06F 8/20 |
| | | | | 712/203 |
| 7,546,226 B1 | * | 6/2009 | Yeh | G06F 16/288 |
| | | | | 703/2 |
| 9,852,184 B2 | * | 12/2017 | Lee | G06F 17/30486 |
| 2007/0143261 A1 | * | 6/2007 | Uppala | G06F 17/30445 |
| 2011/0178787 A1 | * | 7/2011 | Patankar | G06F 16/00 |
| | | | | 703/13 |
| 2012/0254175 A1 | * | 10/2012 | Horowitz | G06F 17/30584 |
| | | | | 707/737 |
| 2014/0280037 A1 | * | 9/2014 | Petride | G06F 16/2453 |
| | | | | 707/719 |
| 2014/0344244 A1 | * | 11/2014 | Weyerhaeuser | G06F 17/30445 |
| | | | | 707/713 |
| 2016/0042039 A1 | * | 2/2016 | Kaufmann | G06F 17/30551 |
| | | | | 707/722 |
| 2016/0350374 A1 | * | 12/2016 | Weyerhaeuser | G06F 17/30466 |

FOREIGN PATENT DOCUMENTS

EP    2556426 A1 *  2/2013  ....... G06F 17/30297

OTHER PUBLICATIONS

Severalnines, "Database Sharding with MySQL Fabric" (Year: 2016).*

* cited by examiner

*Primary Examiner* — Mark D Featherstone
*Assistant Examiner* — Kweku William Halm
(74) *Attorney, Agent, or Firm* — Mintz Levin Cohn Ferris Glovsky and Popeo, P.C.

(57) ABSTRACT

Described herein includes a calculation scenario of a calculation engine that efficiently partitions data for processing at separate hosts, including in parallel, and unions intermediate results from such separate processing when required for further processing. Such parallel processing of partitions can allow for faster processing times, and such unioning of data only when required for further processing can limit the transferring of data that results in slower processing.

18 Claims, 5 Drawing Sheets

PARTITION AWARE PARTIAL QUERY PROCESSING

TECHNICAL FIELD

The subject matter described herein relates to various embodiments of a calculation engine that partitions and unions data for efficient processing.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

Dealing with large amounts of data can result in slow and cumbersome data processing. Partitioning data can assist with more efficiently processing such large amounts of data. For example, a data table including accounting data can have a data partition per accounting year. In distributed systems, the individual partitions can spread over the data landscape to balance the load of each host processing the data. Queries that touch more than one (including all) partitions, for example, may have to union the data in order to run the query processing on the combined data set. The union of the partitions can be hidden by a lower database layer. As a result, a lot of data may have to be transferred to a single host in order to union the data and all the processing is then performed on this single host. This can result in slow processing of the data.

SUMMARY

Aspects of the current subject matter can include detecting a partitioning flag associated with data and processing the data based on the detected flag.

In one aspect, a method includes detecting a partitioning flag at a first datasource operation in a calculation scenario to be executed in a calculation engine of a database management system. The partitioning flag can provide instructions to the calculation scenario regarding table partitions. The method can further include determining, based upon the detected partitioning flag, that a table called by the datasource operator is partitioned into a plurality of partitions on a plurality of computing systems each comprising a programmable processor. Furthermore, the method can include duplicating at least one operator in the calculation scenario that follows the partitioning flag to form a plurality of copies of the at least one operator such that one copy of the at least one operator can be provided to each computing system of the plurality of computing systems for execution on a respective partition of the plurality of partitions to generate an intermediate result for each partition. The method can also include detecting a second flag indicating a union of the intermediate results and unioning the intermediate results for further processing.

In optional variations, one or more of the following features can be included in any feasible combination. The unioning of the intermediate results can include moving the intermediate results to a single computing system. The partitioning flag and the second flag may not affect semantics of the calculation scenario. The method can further include identifying a computing system location for each of the plurality of partitions. The partitioning flag instructions can include whether the plurality of partitions are allowed to be processed on separate computing systems. The method can further include processing the unioned intermediate results according to a subsequent operator. The subsequent operator can require the unioned intermediate results in order to properly execute.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
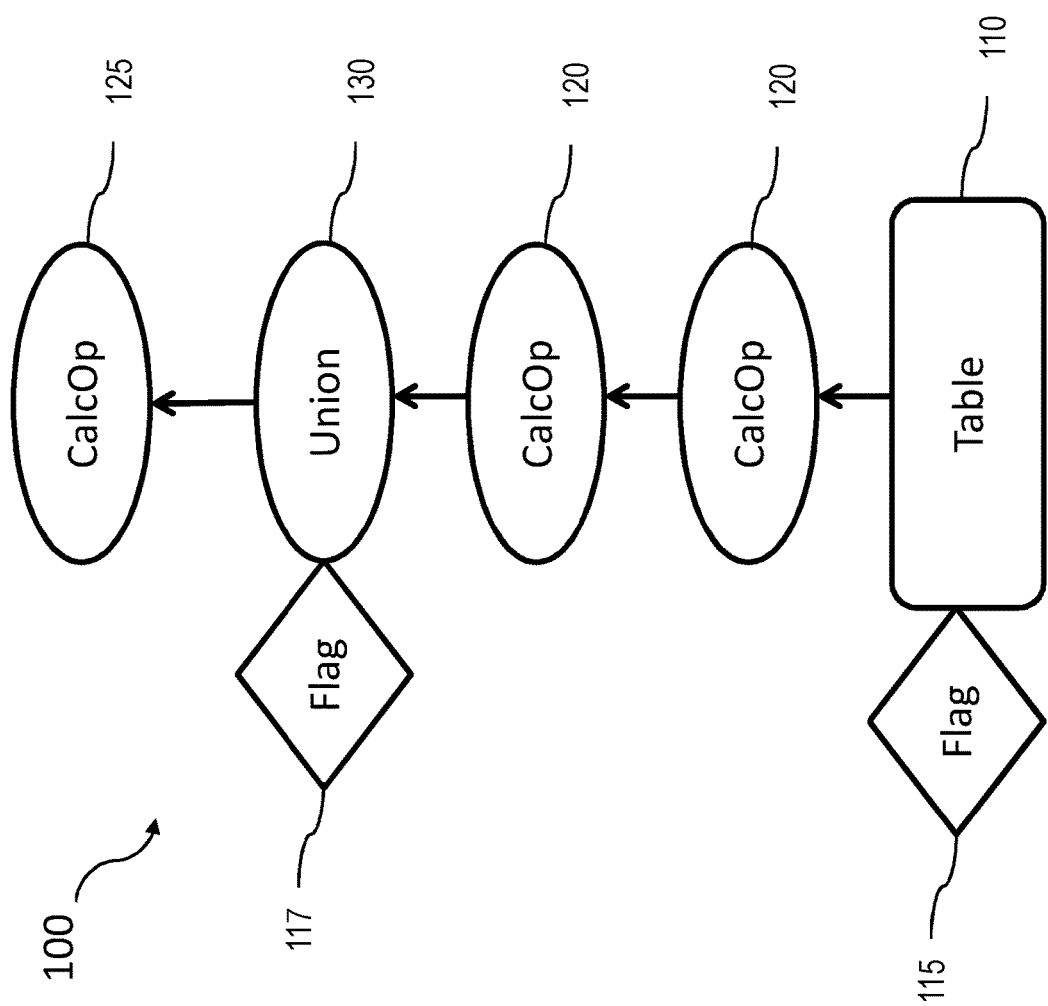
FIG. 1 shows a diagram illustrating an embodiment of a calculation scenario at design time including a table that is flagged for partitioning and a second flag that signals the union of intermediate results from processing of table partitions at separate hosts.

Aspects of the current subject matter include a calculation scenario of a calculation engine that efficiently partitions data (e.g., into table partitions) for processing at separate hosts, including in parallel, and unions intermediate results from such separate processing when required for further processing. Such parallel processing of partitions can allow for faster processing times, and such unioning of data only when required for further processing can limit the transferring of data that results in slower processing. Furthermore, the partitioning of the data (e.g., data table) can be done according to partitions defined in the data and/or the partitioning can be determined during run-time (e.g., "on the fly"). For example, the data can be partitioned according to a number of hosts available for processing the partitions.

For example, some embodiments of the current subject matter include partitioning a table at runtime based on a detected first indicator associated with the table. The first indicator can be associated with the table at design time of the calculation scenario to indicate that if the table is partitioned, the table partitions are to be processed in parallel. The table partitions can be processed in parallel by separate hosts (e.g., processors, computers), thereby allowing for faster processing of the data contained in the table.

The table partitions (or intermediate results) can be unioned for further processing when a second indicator associated with the calculation scenario is detected. Such second indicator can be included in the calculation scenario during design time of the calculation scenario. The unioning of the table partitions allows for subsequent processing (e.g., calculation operations) of all of the data contained in the table (or all intermediate results) at a single processor. For example, the second indicator can be included in a calculation scenario prior to a processing step that requires all of the data contained in the table to be analyzed. Thus the first indicator allows for efficient identification of large blocks of data (e.g., data table) that can be partitioned for processing (including parallel processing) of small blocks of data thereby allowing for faster processing of data. In addition, the second indicator can allow for efficient identification of a subsequent processing step (e.g., calculation operation) where all of the data contained in the table (or all intermediate results) is needed for completing the subsequent processing step. As such, the current subject matter reduces unnecessary transferring of data while also improving processing times.

The current subject matter includes the use of various annotations (e.g., flags), including union operators and/or table datasource operators, during design time of a calculation scenario. Such union operator and/or table datasource operators can be executed during runtime per data partition without changing the semantics of a calculation scenario of the calculation engine. For example, parallel processing of the partitions can be done without changing the semantics of the calculation scenario. The table datasource operator and at least one following (including all) operators can be duplicated per partition. The union operator can unite one or more intermediate results from each partition (e.g., after detection of a second flag), such as onto a single computing system. Further operations can be modelled on top of the union operator and may not be parallelized. This can enable best possible response times and system utilization, such as for the distributed HANA database systems.

During execution plan generation, the number of partitions can be determined and the operators per partition can be added to the execution plan. To avoid unnecessary data transfer between hosts, the host location of each individual partition can be considered when the execution plan is created. This can allow operations beginning from the table datasource to the union operator being scheduled for execution on a host where the partition is physically located. For the union, the location does not matter since data has to be transferred anyway from all hosts to one host.

FIG. 1 shows a diagram illustrating an embodiment of a calculation scenario 100 at design time including a datasource operator or table 110 that is flagged (shown as first flag 115) for partitioning and a second flag 117 (e.g., at processing step 130) that signals the union of table partitions, such as before further processing. Between the first flag 115 and the second flag 117 the calculation scenario 100 includes one or more first operations 120 (e.g., calculation operations) that can be performed on parts of the table, such as on one or more table partitions. As such, the first operations 120 do not require all of the data contained in the table in order to perform associated operations. Furthermore, parallel processing of each table partition can be performed using the first operations 120.

As shown in FIG. 1, the calculation scenario 100 can include a union operator and/or processing step 130 including the second flag 117 that signals the union of the processed table partitions. At this stage, intermediate results of the processed table partitions are unioned before further processing is performed. Such flagging for unioning can be inserted in the calculation scenario 100 prior to a second operation (e.g., calculation operation 125) that requires processing of all of the data contained in the table (or all intermediate results) at a single host.

The number and type of operations included in the calculation scenario can vary. For example, some operations, including calculation operations, can include joins and unions. Furthermore, the number and type of flags or indicators used to identify partitioning and unioning of data within a calculation scenario can vary and are not limited to the examples disclosed herein. For example, a flag can include specific directions for joining more than one table and creating a view of the joined tables. In addition, the number of partitions in a table and the way in which a table is partitioned and/or how partitions are unioned can vary and are not limited to the examples disclosed herein.

Figure 2:
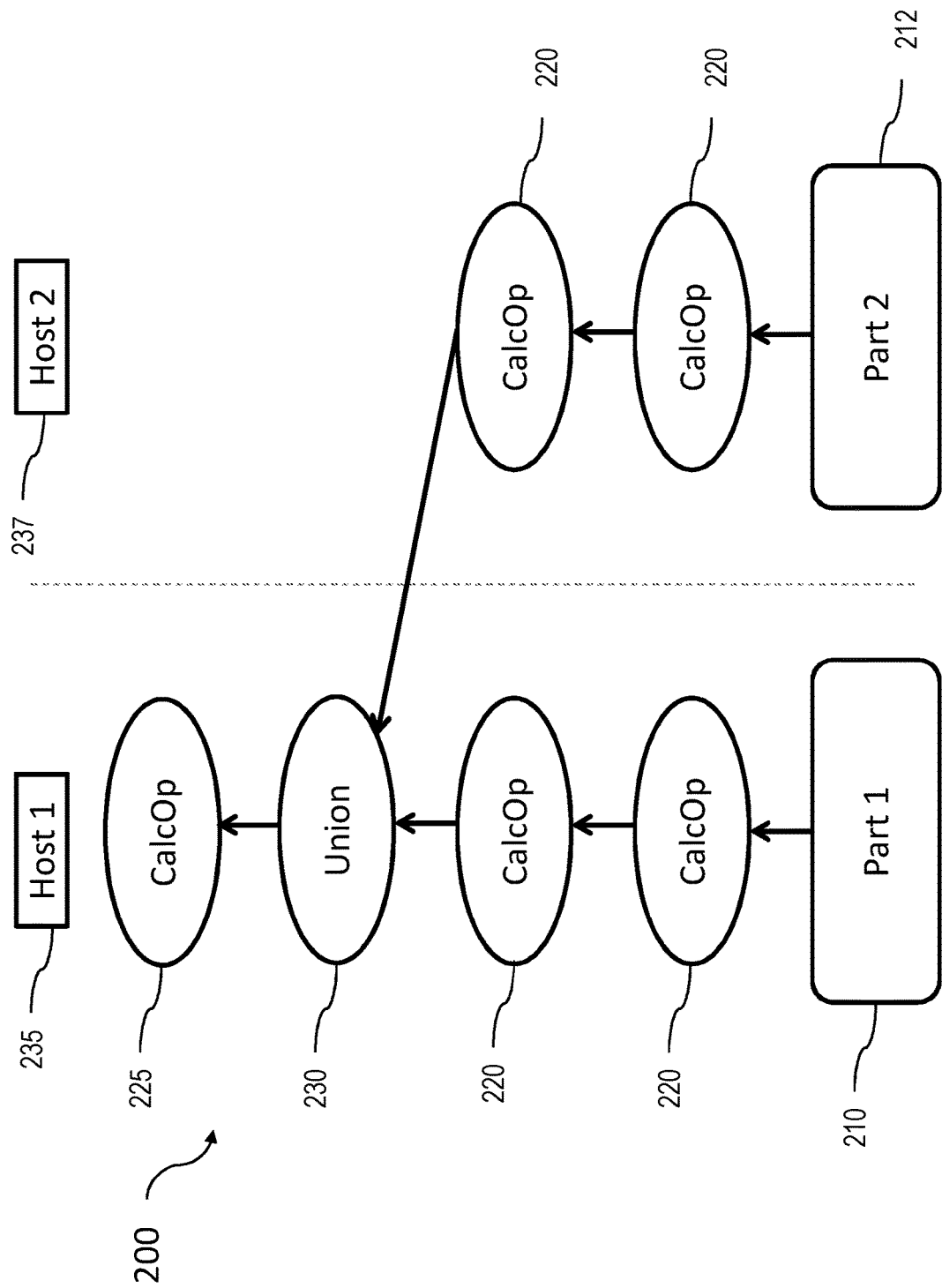
FIG. 2 shows a diagram illustrating an embodiment of a runtime scenario of the calculation scenario shown in FIG. 1 including the partitioning of the table into a first part and a second part for parallel processing, as well as unioning intermediate results for the processing of the table partitions before a final operation is performed.

FIG. 2 shows a diagram illustrating an embodiment of runtime operations 200 of the calculation scenario 100 illustrated in FIG. 1. As shown in FIG. 2, the table 110 has been partitioned into a first table part 210 and a second table part 212. The first table part 210 and the second table part 212 can be processed in parallel, with each table part 210, 212 being processed on separate hosts. Additionally, the first operations 120, which reside between the first flag 115 and the second flag 117 (as shown in FIG. 1) are copied over along with the second table part 212 to be processed on a separate host. As such, the first operations 120 can be applied to the first table part 210 on a first host 235 and the first operations 120 can be applied to the second table part 212 on a second host 237. This allows for parallel and faster processing of the first and second table parts 210, 212 thereby resulting in faster processing of the table 110 as a whole.

The first and second table parts 210, 212 and/or their intermediate results from processing can be unioned at the union operator or processing step 230 (which was flagged with the second flag 117, as shown in FIG. 1). This can allow the second operation 225, which may require all of the data from the table 110 and/or intermediate results, to process the data from first and second table parts 210, 212 at the same host (e.g., the first host 235). As such, data is transferred between hosts only when necessary thereby improving processing efficiency and time.

Figure 3:
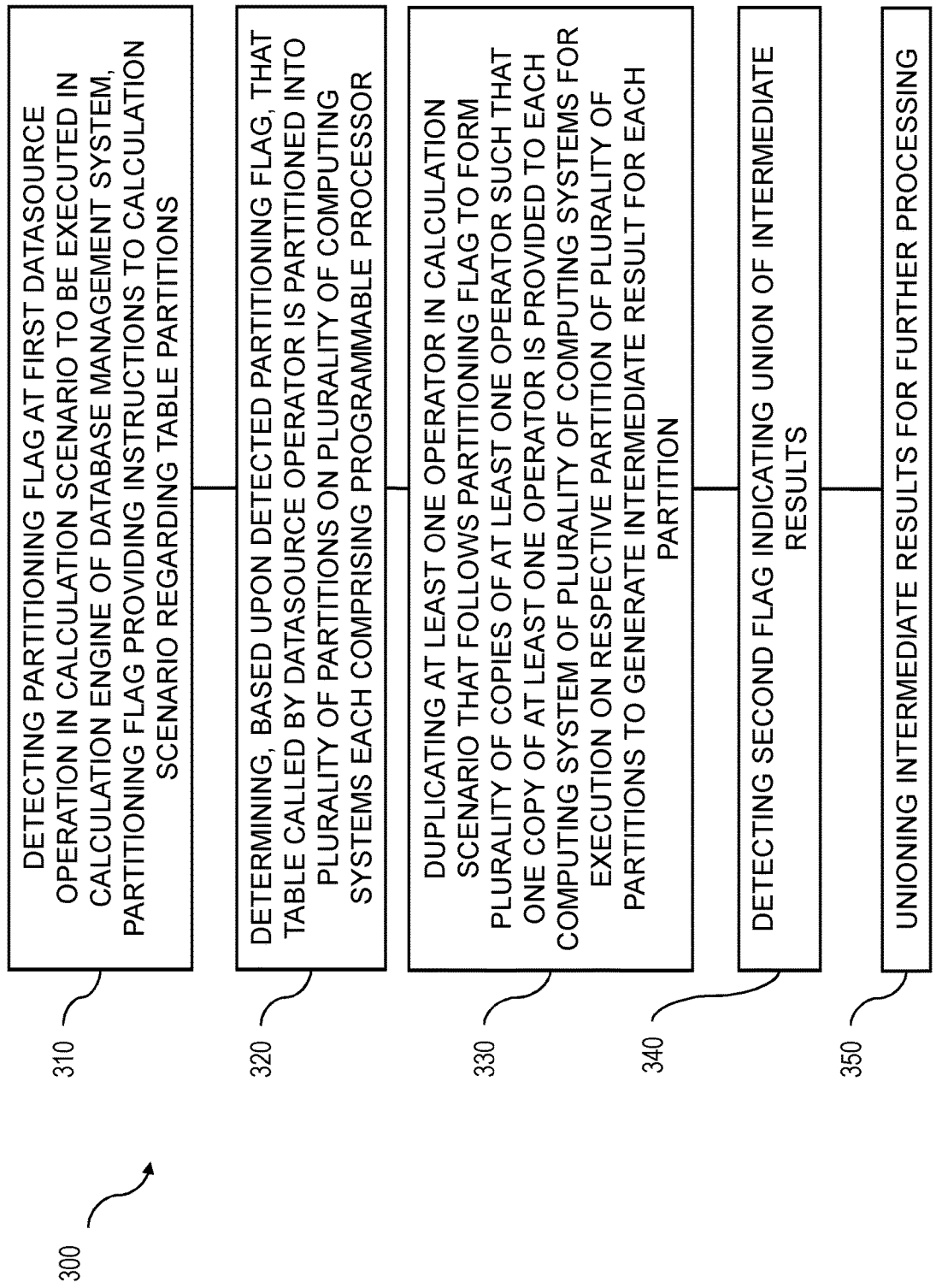
FIG. 3 shows a process flow diagram illustrating aspects of a method having one or more features consistent with implementations of the current subject matter.

FIG. 3 shows a process flow chart 300 illustrating features of a method consistent with one or more implementations of the current subject matter. It will be understood that other implementations may include or exclude certain features.

At 310, a partitioning flag can be detected at a first datasource operation in a calculation scenario to be executed in a calculation engine of a database management system. The partitioning flag can provide instructions to the calculation scenario regarding table partitions. For example, the partitioning flag instructions can include whether the plurality of partitions are allowed to be processed on separate computing systems.

At 320, based upon the detected partitioning flag, it can be determined that a table called by the datasource operator is partitioned into a plurality of partitions on a plurality of computing systems each comprising a programmable processor. In some implementations, for example, a computing system location for each of the plurality of partitions can be identified.

At 330, at least one operator is duplicated in the calculation scenario that follows the partitioning flag to form a plurality of copies of the at least one operator such that one copy of the at least one operator is provided to each computing system of the plurality of computing systems for execution on a respective partition of the plurality of partitions to generate an intermediate result for each partition.

At 340, a second flag can be detected indicating a union of the intermediate results. For example, the partitioning flag and the second flag cannot affect semantics of the calculation scenario.

At 350, the intermediate results can be unioned for further processing. For example, the unioning of the intermediate results can include moving the intermediate results to a single computing system.

Figure 4:
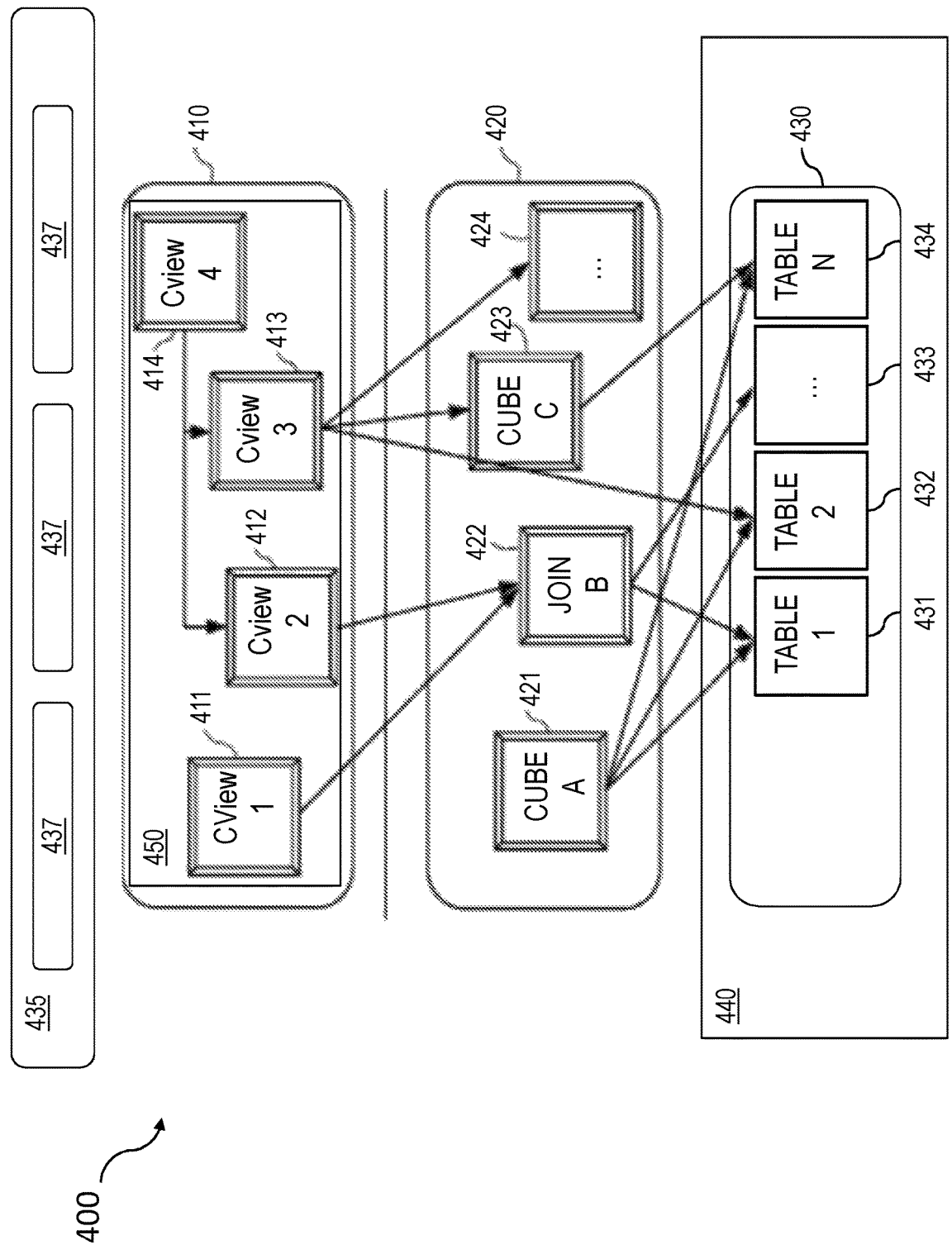
FIG. 4 shows a diagram illustrating a computing architecture consistent with implementations of the current subject matter including a database system that includes three layers: a calculation engine layer, a logical layer, and a physical table-pool.

FIG. 4 is a diagram that illustrates a computing architecture 400 including a database system that includes three layers: a calculation engine layer 410, a logical layer 420, and a physical table-pool 430. One or more application servers 435 implementing database client applications 437 can access the database system. Calculation scenarios can be executed by a calculation engine, which can form part of a database or which can be part of the calculation engine layer 410 (which is associated with the database). The calculation engine layer 410 can be based on and/or interact with the other two layers, the logical layer 420 and the physical table pool 430. The basis of the physical table pool 430 consists of physical tables (called indexes) containing the data, which can be stored on one more database servers 440. Various tables 431-434 can be joined using logical metamodels 421-424 defined by the logical layer 420 to form an index. For example, the tables 431-434 in a cube (e.g. an online analytical processing or "OLAP" index) can be assigned roles (e.g., fact or dimension tables) and joined to form a star schema. It is also possible to form join indexes (e.g. join index B 422 in FIG. 4), which can act like database views in computing environments such as the Fast Search Infrastructure (FSI) available from SAP SE of Walldorf, Germany.

As stated above, a calculation scenario 450 can include individual nodes (e.g. calculation nodes) 411-414, which in turn each define operations such as joining various physical or logical indexes and other calculation nodes (e.g., CView 4 is a join of CView 2 and CView 3). That is, the input for a node 411-414 can be one or more physical, join, or OLAP indexes or calculation nodes.

In a calculation scenario 450, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 450 can be created which can be reused by multiple queries even if such queries do not require every attribute specified by the calculation scenario 450.

Every calculation scenario 450 can be uniquely identifiable by a name (e.g., the calculation scenario 450 can be a database object with a unique identifier, etc.). Accordingly, the calculation scenario 450 can be queried in a manner similar to a view in a SQL database. Thus, the query is forwarded to the calculation node 411-414 for the calculation scenario 450 that is marked as the corresponding default node. In addition, a query can be executed on a particular calculation node 411-414 (as specified in the query). Furthermore, nested calculation scenarios can be generated in which one calculation scenario 450 is used as source in another calculation scenario (e.g. via a calculation node 411-414 in this calculation scenario 450). Each calculation node 411-414 can have one or more output tables. One output table can be consumed by several calculation nodes 411-414.

Figure 5:
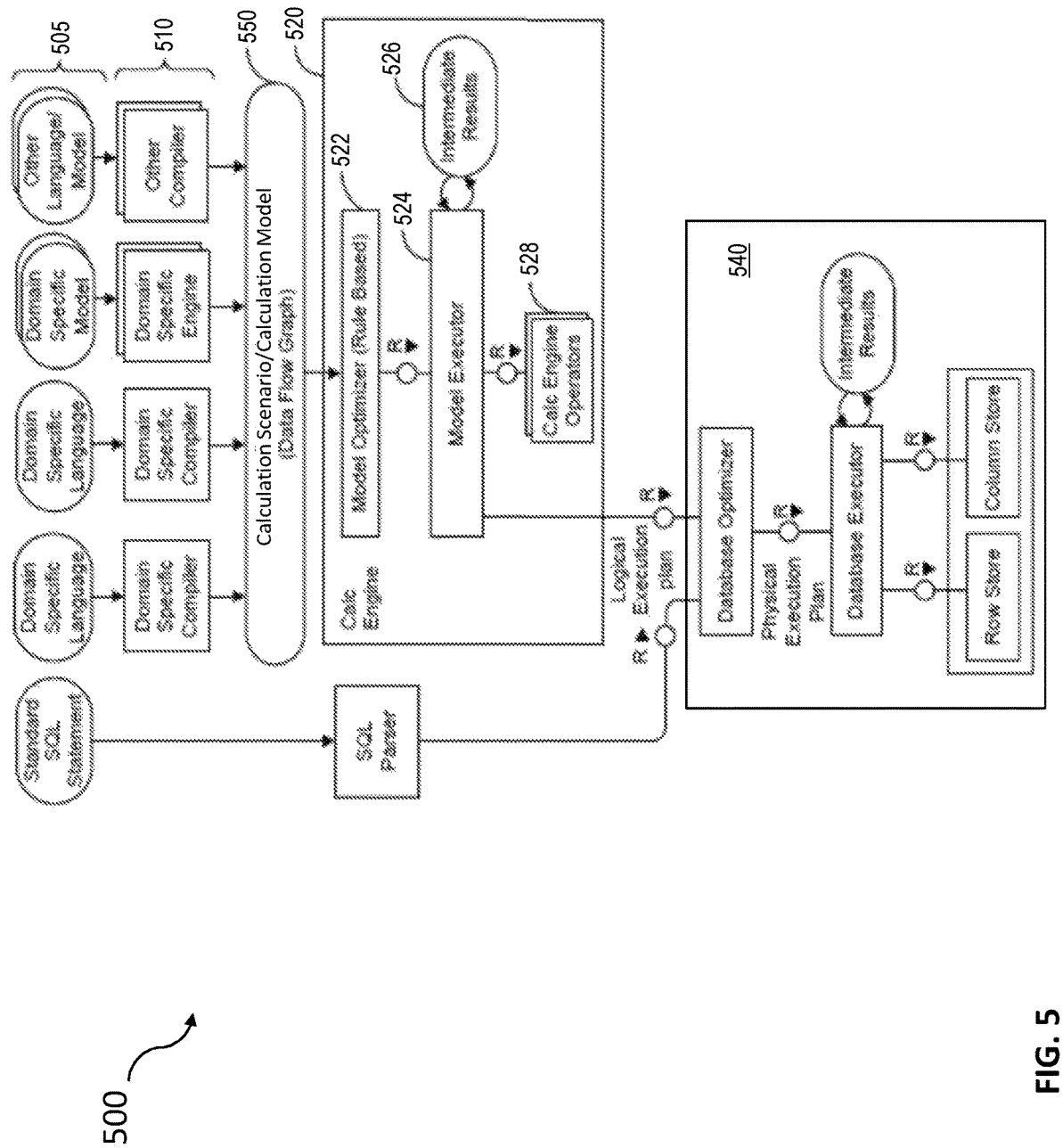
FIG. 5 shows a diagram illustrating a sample architecture for request processing and execution control consistent with implementations of the current subject matter.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 550 (which is also referred to in FIG. 5 as a calculation model). To achieve enhanced performance, the models and programs written in these languages are executed inside the database server 540. This arrangement eliminates the need to transfer large amounts of data between the database server 540 and a client application 437, which can be executed by an application server 435. Once the different artifacts 505 are compiled into this calculation scenario, they can be processed and executed in the same manner. A calculation engine 520 executes the calculation scenarios 550.

A calculation scenario 550 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 550 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 550 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 550 can be defined as part of database metadata and invoked multiple times. A calculation view can be created, for example, by a SQL statement "CREATE COLUMN VIEW <schema>.<viewName> TYPE CALCULATION WITH PARAMETERS". Once a calculation view is created it can be queried (e.g., "SELECT FROM <calcview_name>", etc.). In some cases, databases can have pre-defined calculation scenarios 550 (default, previously defined by users, etc.). Calculation scenarios 550 can be persisted in a repository (coupled to the database server 540) or in transient scenarios. Calculation scenarios 550 can also be kept in-memory.

Calculation scenarios 550 are more powerful than traditional SQL queries or SQL views for many reasons. One reason is the possibility to define parameterized calculation schemas that are specialized when the actual query is issued. Unlike a SQL view, a calculation scenario 550 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 550 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 550. This instantiated calculation scenario 550 is optimized for the actual query and does not contain attributes, nodes or data flows that are not needed for the specific invocation.

When the calculation engine 520 gets a request to execute a calculation scenario 550, it can first optimize the calculation scenario 550 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 550. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 550 (not implemented in the calculation engine 520) can be transformed by the model executor 524 into a set of logical database execution plans. Multiple set operation nodes can be combined into one logical database execution plan if possible.

The calculation scenarios 550 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 550 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

The attributes of the incoming datasets utilized by the rules of model optimizer 522 can additionally or alternatively be based on an estimated and/or actual amount of memory consumed by the dataset, a number of rows and/or columns in the dataset, and the number of cell values for the dataset, and the like.

A calculation scenario 550 as described herein can include a type of node referred to herein as a semantic node (or sometimes semantic root node). A database modeler can flag the root node (output) in a graphical calculation view to which the queries of the database applications directed as semantic node. This arrangement allows the calculation engine 520 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
at least one processor; and
at least one memory including instructions which when executed by the at least one processor cause operations comprising:
detecting a partitioning flag at a first datasource operation in a calculation scenario to be executed in a calculation engine of a database management system, the partitioning flag being set at a design time of the calculation scenario and providing instructions to the calculation scenario regarding parallel processing of table partitions at a runtime of the calculation scenario, the calculation scenario defining a common structure for execution of a plurality of queries having one or more first attributes, wherein the calculation scenario defines one or more parameterized calculation schemas for the defined common structure for execution of the plurality of queries, the one or more parameterized calculations schemas including one or more aggregation nodes identifying one or more dimensions for aggregating of one or more table partitions;
determining, based upon the detected partitioning flag, that a table in a plurality of tables called by the datasource operator is partitioned into a plurality of partitions on a plurality of computing systems each comprising a programmable processor, each table in the plurality of tables being assigned a role and being joined in accordance with a predetermined schema using one or more metamodels in a plurality of metamodels;
duplicating at least one operator, including a table datasource operator, per partition in the plurality of partitions, in the calculation scenario that follows the partitioning flag to form a plurality of copies of the at least one operator such that one copy of the at least one operator is provided to each computing system of the plurality of computing systems for execution on a respective partition of the plurality of partitions to generate an intermediate result for each partition;
parallel processing, by each respective computing system, each partition in the plurality of partitions, from each partition's table data source operator to a second flag indicating a union of the intermediate results, and in accordance with a physical location of each partition, without changing the calculation scenario and generating the intermediate result for each partition;
detecting, at the runtime of the calculation scenario, the second flag indicating the union of the intermediate results;
unioning the intermediate results, the unioning including:
defining one or more specific dimensions in the one or more dimensions for aggregating and filtering of the intermediate results;
selecting, based on the defined one or more specific dimensions, a computing system in the plurality of computing systems;
transferring the intermediate results to the selected computing system; and
unioning the transferred intermediate results by the selected computing system in accordance with the defined one or more specific dimensions; and
executing, by reusing the defined common structure of the calculation scenario and using the unioned intermediate results, a query in the plurality of queries having one or more second attributes being different from the one or more first attributes, wherein execution of the query using the calculation scenario includes transforming one or more nodes of the calculation scenario not used by the calculation scenario to execute the query into one or more logical database execution plans and combining the one or more logical database execution plans into a single database execution plan for execution of the query.

2. The system of claim 1, wherein the unioning of the intermediate results comprises moving the intermediate results to a single computing system.

3. The system of claim 1, wherein the partitioning flag and the second flag do not affect semantics of the calculation scenario.

4. The system of claim 1, where the operations further comprise identifying a computing system location for each of the plurality of partitions.

5. The system of claim 1, wherein the partitioning flag instructions include whether the plurality of partitions are allowed to be processed on separate computing systems.

6. The system of claim 1, where the operations further comprise processing the unioned intermediate results according to a subsequent operator, the subsequent operator requiring the unioned intermediate results in order to properly execute.

7. A computer program product comprising a non-transitory computer-readable storage medium storing instructions that, when executed by at least one programmable processor, cause the at least one programmable processor to perform operations comprising:
   detecting a partitioning flag at a first datasource operation in a calculation scenario to be executed in a calculation engine of a database management system, the partitioning flag being set at a design time of the calculation scenario and providing instructions to the calculation scenario regarding parallel processing of table partitions at a runtime of the calculation scenario, the calculation scenario defining a common structure for execution of a plurality of queries having one or more first attributes, wherein the calculation scenario defines one or more parameterized calculation schemas for the defined common structure for execution of the plurality of queries, the one or more parameterized calculations schemas including one or more aggregation nodes identifying one or more dimensions for aggregating of one or more table partitions;
   determining, based upon the detected partitioning flag, that a table in a plurality of tables called by the datasource operator is partitioned into a plurality of partitions on a plurality of computing systems each comprising a programmable processor, each table in the plurality of tables being assigned a role and being joined in accordance with a predetermined schema using one or more metamodels in a plurality of metamodels;
   duplicating at least one operator, including a table datasource operator, per partition in the plurality of partitions, in the calculation scenario that follows the partitioning flag to form a plurality of copies of the at least one operator such that one copy of the at least one operator is provided to each computing system of the plurality of computing systems for execution on a respective partition of the plurality of partitions to generate an intermediate result for each partition;
   parallel processing, by each respective computing system, each partition in the plurality of partitions, from each partition's table data source operator to a second flag indicating a union of the intermediate results, and in accordance with a physical location of each partition, without changing the calculation scenario and generating the intermediate result for each partition;
   detecting, at the runtime of the calculation scenario, the second flag indicating the union of the intermediate results;
   unioning the intermediate results, the unioning including:
      defining one or more specific dimensions in the one or more dimensions for aggregating and filtering of the intermediate results;
      selecting, based on the defined one or more specific dimensions, a computing system in the plurality of computing systems;
      transferring the intermediate results to the selected computing system; and
      unioning the transferred intermediate results by the selected computing system in accordance with the defined one or more specific dimensions; and
   executing, by reusing the defined common structure of the calculation scenario and using the unioned intermediate results, a query in the plurality of queries having one or more second attributes being different from the one or more first attributes, wherein execution of the query using the calculation scenario includes transforming one or more nodes of the calculation scenario not used by the calculation scenario to execute the query into one or more logical database execution plans and combining the one or more logical database execution plans into a single database execution plan for execution of the query.

8. The computer program product of claim 7, wherein the unioning of the intermediate results comprises moving the intermediate results to a single computing system.

9. The computer program product of claim 7, wherein the partitioning flag and the second flag do not affect semantics of the calculation scenario.

10. The computer program product of claim 7, where the operations further comprise identifying a computing system location for each of the plurality of partitions.

11. The computer program product of claim 7, wherein the partitioning flag instructions include whether the plurality of partitions are allowed to be processed on separate computing systems.

12. The computer program product of claim 7, where the operations further comprise processing the unioned intermediate results according to a subsequent operator, the subsequent operator requiring the unioned intermediate results in order to properly execute.

13. A method for implementation by one or more data processors forming part of at least one computing system, the method comprising:
   detecting a partitioning flag at a first datasource operation in a calculation scenario to be executed in a calculation engine of a database management system, the partitioning flag being set at a design time of the calculation scenario and providing instructions to the calculation scenario regarding parallel processing of table partitions at a runtime of the calculation scenario, the calculation scenario defining a common structure for execution of a plurality of queries having one or more first attributes, wherein the calculation scenario defines one or more parameterized calculation schemas for the defined common structure for execution of the plurality of queries, the one or more parameterized calculations schemas including one or more aggregation nodes identifying one or more dimensions for aggregating of one or more table partitions;

determining, based upon the detected partitioning flag, that a table in a plurality of tables called by the datasource operator is partitioned into a plurality of partitions on a plurality of computing systems each comprising a programmable processor, each table in the plurality of tables being assigned a role and being joined in accordance with a predetermined schema using one or more metamodels in a plurality of metamodels;

duplicating at least one operator, including a table datasource operator, per partition in the plurality of partitions, in the calculation scenario that follows the partitioning flag to form a plurality of copies of the at least one operator such that one copy of the at least one operator is provided to each computing system of the plurality of computing systems for execution on a respective partition of the plurality of partitions to generate an intermediate result for each partition;

parallel processing, by each respective computing system, each partition in the plurality of partitions, from each partition's table data source operator to a second flag indicating a union of the intermediate results, and in accordance with a physical location of each partition, without changing the calculation scenario and generating the intermediate result for each partition;

detecting, at the runtime of the calculation scenario, the second flag indicating the union of the intermediate results;

unioning the intermediate results, the unioning including:
defining one or more specific dimensions in the one or more dimensions for aggregating and filtering of the intermediate results;
selecting, based on the defined one or more specific dimensions, a computing system in the plurality of computing systems;
transferring the intermediate results to the selected computing system; and
unioning the transferred intermediate results by the selected computing system in accordance with the defined one or more specific dimensions; and executing, by reusing the defined common structure of the calculation scenario and using the unioned intermediate results, a query in the plurality of queries having one or more second attributes being different from the one or more first attributes, wherein execution of the query using the calculation scenario includes transforming one or more nodes of the calculation scenario not used by the calculation scenario to execute the query into one or more logical database execution plans and combining the one or more logical database execution plans into a single database execution plan for execution of the query.

14. The method of claim 13, wherein the unioning of the intermediate results comprises moving the intermediate results to a single computing system.

15. The method of claim 13, wherein the partitioning flag and the second flag do not affect semantics of the calculation scenario.

16. The method of claim 13, further comprising identifying a computing system location for each of the plurality of partitions.

17. The method of claim 13, wherein the partitioning flag instructions include whether the plurality of partitions are allowed to be processed on separate computing systems.

18. The method of claim 13, further comprising processing the unioned intermediate results according to a subsequent operator, the subsequent operator requiring the unioned intermediate results in order to properly execute.

* * * * *